United States Patent
Amagasa et al.

(10) Patent No.: US 7,385,367 B2
(45) Date of Patent: Jun. 10, 2008

(54) MOTOR CONTROL METHOD AND MOTOR CONTROLLER

(75) Inventors: Toshiyuki Amagasa, Kiryu (JP); Takeshi Ikeda, Kiryu (JP); Mikihito Shimoyama, Kiryu (JP); Hideaki Hakoda, Kiryu (JP); Yasuhiro Nagahara, Kiryu (JP)

(73) Assignee: Mitsuba Corporation, Gunma (JP)

( * ) Notice: Subject to any disclaimer, the term of this patent is extended or adjusted under 35 U.S.C. 154(b) by 9 days.

(21) Appl. No.: 10/544,670

(22) PCT Filed: Feb. 13, 2004

(86) PCT No.: PCT/JP2004/001551

§ 371 (c)(1),
(2), (4) Date: Aug. 4, 2005

(87) PCT Pub. No.: WO2004/073154

PCT Pub. Date: Aug. 26, 2004

(65) Prior Publication Data

US 2006/0202652 A1     Sep. 14, 2006

(30) Foreign Application Priority Data

Feb. 14, 2003   (JP) .............................. 2003-036054

(51) Int. Cl.
H02K 17/32      (2006.01)
(52) U.S. Cl. .................... 318/434; 318/432; 318/DIG. 2
(58) Field of Classification Search .................. None
See application file for complete search history.

(56) References Cited

U.S. PATENT DOCUMENTS

| | | | | |
|---|---|---|---|---|
| 4,237,408 A | * | 12/1980 | Frecka | 318/571 |
| 5,703,449 A | * | 12/1997 | Nagate et al. | 318/254 |
| 6,054,822 A | * | 4/2000 | Harada | 318/434 |
| 6,166,502 A | * | 12/2000 | Pattok et al. | 318/434 |
| 6,232,737 B1 | * | 5/2001 | Kachi et al. | 318/610 |
| 6,538,412 B1 | * | 3/2003 | Klose et al. | 318/801 |
| 6,593,720 B2 | * | 7/2003 | Omekanda | 318/701 |
| 6,650,075 B2 | * | 11/2003 | Otsuka et al. | 318/268 |
| 6,819,008 B2 | * | 11/2004 | Kaplan et al. | 290/44 |
| 7,071,659 B1 | * | 7/2006 | Torrey et al. | 322/59 |

* cited by examiner

*Primary Examiner*—Bentsu Ro
*Assistant Examiner*—Renata McCloud
(74) *Attorney, Agent, or Firm*—Wenderoth, Lind & Ponack, L.L.P.

(57) ABSTRACT

A motor speed, duty, and power source voltage are detected (steps S1 to S3). Referring to a load point map, a load point value is obtained (steps S4 and S5). The load point map is created with the motor speed, duty, and power source voltage taken as parameters, and is corrected in accordance with atmospheric temperature of the motor. After the load point value is obtained, the value is accumulated (step S6). The accumulated point value and a predetermined threshold value are compared with each other (step S7). If the accumulated point value exceeds the threshold value, an overloaded state is determined and the accumulated point value is stored (step S8). Thereafter, the motor is stopped.

14 Claims, 6 Drawing Sheets

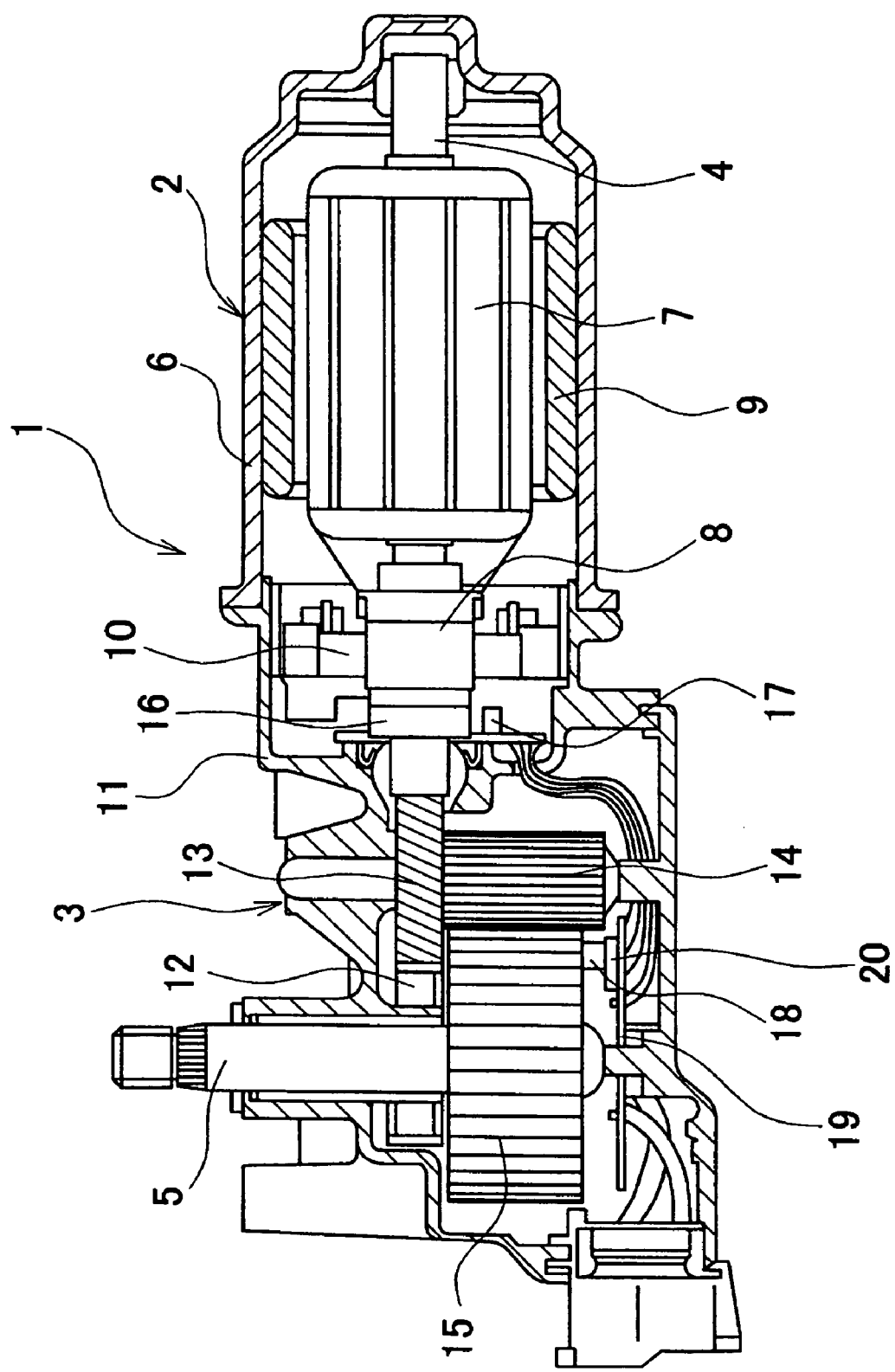
F I G. 1

MOTOR CONTROL METHOD AND MOTOR CONTROLLER

TECHNICAL FIELD

The present invention relates to control of driving of an electric motor, and particularly, to detection of an overloaded state and control of operation at the time of the overloaded state.

BACKGROUND ART

In general, electric motors used in cars and the like are equipped with a circuit breaker using bimetal or the like in order to prevent burnout of armatures caused by continuous use in an overloaded state. In addition, it is necessary for a system having a motor control circuit to prevent breakdown of not only armatures but also switching elements such as FETs. This kind of system adopts a method of detecting an electric current to protect elements, in many cases. In this case, a current sensor or the like which detects the amount of an electric current, depending on changes in peripheral magnetic flux caused by changes in current amount, is used to detect the electric current, and a current detection circuit in a controller detects an over current.

For another system of a type which controls driving of a motor by obtaining a pulse output according to rotation of the motor, there has been a known method of determining a state of the motor depending on whether a motor pulse is detected or not. In a motor of this kind, the motor pulse is constantly detected during rotation. If no pulse can be detected while a voltage is applied, the motor can be determined as having been locked. Hence, when the motor comes into a pulse-undetected state, the motor output is stopped to avoid continuous use in an overloaded state. Thus, the motor is prevented from being damaged.

In the method of using a circuit breaker or a current sensor, however, components of the breaker or sensor have to be included in circuits and hence cause a problem that the system becomes expensive. If a current detection circuit is provided, the whole size of the controller becomes large accordingly. In the case of a motor which has only a small capacity space, like a motor for a car, there are limitations concerning layout. Therefore, another problem arises in that no space can be maintained to provide the controller with the current detection circuit, depending on the installation location.

On the other side, the other method of determining an overload depending on the motor pulse does not use a current sensor or the like. Hence, the system can be constructed at low cost. In this method, however, if an overloaded state continues for a long time period without causing the motor to be locked, the motor continues operating even at a low speed, and so, a motor pulse can be detected. Although the motor is in an overloaded state, the overloaded state cannot be detected adequately. As a consequence, a problem arises in that the motor is damaged.

The present invention has an object of providing a motor control method and a motor controller capable of adequately knowing an overloaded state of the motor.

SUMMARY OF THE INVENTION

According to an aspect of the present invention, there is provided a motor control method in which a load point value is calculated, based on a time ratio of an ON period of a power source voltage applied to a motor and a speed of the motor. The calculated load point value is accumulated, and an overload control processing is performed on the motor if the accumulated point value exceeds a predetermined reference value.

According to the present invention, an overloaded state can be detected and a countermeasure against the overloaded state can be taken, without using a circuit breaker or a current sensor. As a result, costs can be reduced. Since space is not necessary for a circuit breaker or current sensor, the whole unit can be downsized. Accordingly, space saving and improvement of layout can be achieved. In addition, it is possible to perform an overload detection processing even when there is no space to mount a breaker or the like. Further, reference values can be appropriately set by software. Therefore, the degree of freedom in the control form is so high that control setting can be matched with use environments of the motor and peripheral devices.

In the motor control method described above, the load point value may be calculated from a load map in which the load point value is set with the time ratio and the speed of the motor taken as parameters. In this case, the load point value may be set such that the higher the time ratio is, the greater the load point value is. Further, the load point value may be set such that the lower the speed of the motor is, the greater the load point value is.

In the load map, the load point value may further be set with the power source voltage value taken as a parameter. In this case, the load point value may be set such that the higher the power source voltage is, the greater the load point value is.

The load point value may be changed continuously based on the time ratio, the speed of the motor, and the power source voltage value.

Further, the load map may be corrected in accordance with an atmospheric temperature of the motor. In this case, the load point value may be set such that the higher the atmospheric temperature is, the greater the load point value is.

In the motor control method described above, the motor may be stopped by the overload control processing. Alternatively, an output of the motor may be reduced by the overload control processing.

In addition, in the motor control method described above, when the accumulated point value exceeds the reference value, the accumulated load point value at this point of time may be stored. Further, if the motor is restarted after once having been stopped, the stored accumulated point value may be taken as an initial value of the accumulated point value.

According to another aspect of the present invention, there is provided a motor control device comprising: a point value calculation unit for calculating a load point value, based on a time ratio of an ON period of a power source voltage applied to a motor and based on a speed of the motor; a point value accumulation unit for accumulating the calculated load point value; a point value comparison unit for comparing the accumulated point value with a predetermined reference value; and an instruction unit for performing an overload control processing on the motor if the accumulated point value exceeds the reference value.

According to the present invention, an overloaded state can be detected and a countermeasure against the overloaded state can be taken, without using a circuit breaker or a current sensor. As a result, costs can be reduced. Further, since space is unnecessary for a circuit breaker or current sensor, the whole unit can be downsized. Accordingly, space saving and improvement of layout can be achieved. In addition, it is possible to perform an overload detection processing even when there is no space to mount a breaker or the like. Further, reference values can be appropriately set by software. Therefore, the degree of freedom in the control form is so great that control setting can be matched with use environments of the motor and peripheral devices.

In the motor control device described above, the load point value may be calculated from a load map in which the load point value is set with the time ratio and the speed of the motor taken as parameters. Further, in the load map, the load point value may be set with the power source voltage value taken as a parameter. In addition, the load map may be corrected in accordance with an atmospheric temperature of the motor.

In the motor control device described above, the motor may be stopped by the overload control processing. Alternatively, an output of the motor may be reduced by the overload control processing.

Also, in the motor control device described above, a storage means for storing the accumulated point value before the motor stops may be provided. Further, if the motor is restarted after once having been stopped, the accumulated point value stored in the storage means may be referred to and taken as an initial value of the accumulated point value.

BRIEF DESCRIPTION OF THE DRAWINGS

FIG. 1 is an explanatory view showing the structure of a motor unit having a motor to which the motor control method according to the present invention is applied;

DETAILED DESCRIPTION OF THE INVENTION

Figure 2:
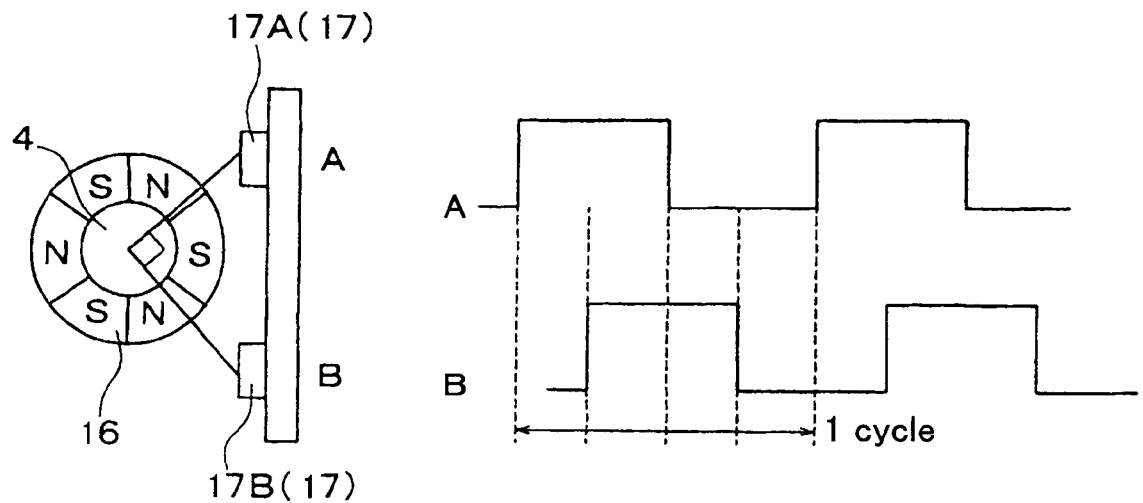
FIG. 2 is an explanatory view showing a relationship between a magnet and hall effect ICs in the motor unit shown in FIG. 1, and output signals (motor pulse) of the hall effect ICs.

Hereinafter, an embodiment of the present invention will be specifically described on the basis of the drawings.

FIG. 1 is an explanatory view showing the structure of a motor unit having a motor to which a motor control method of the present invention is applied. The motor unit 1 shown in FIG. 1 is used as a drive source of an electric equipment for a vehicle, e.g., a wiper for a car. The rotation direction is switched between the normal and reverse rotations when a wiper blade (hereinafter abbreviated simply as a blade) reaches upper and lower reversal positions.

The motor unit 1 is constituted by a motor 2 and a gear box 3. Rotation of a motor shaft 4 of the motor 2 is decelerated inside the gear box 3 and outputted to an output shaft 5. The motor shaft 4 is rotatably supported by a yoke 6 having a bottomed cylindrical shape, and an armature core 7 with a coil wounded around, and a commutator 8 are attached. Permanent magnets 9 are fixed to the inner surface of the yoke 6. A power supply brush 10 is slidingly connected to the commutator 8. The speed (rotation speed) of the motor 2 is controlled by an amount of the current supplied to the brush 10.

A case frame 11 of the gear box 3 is mounted on an edge part of the yoke 6 in the opening side thereof. A top end part of the motor shaft 4 is protruded from the yoke 6 and is contained in the case frame 11. A worm 12 is formed at the top end part of the motor shaft 4, and a worm gear 13 rotatably supported by the case frame 11 is engaged with the worm 12. The worm gear 13 is provided integrally with a first gear 14 having a small diameter such that the first gear 14 is coaxial to the worm gear 13. A second gear 15 having a large diameter is engaged with the first gear 14. The second gear 15 is provided integrally with an output shaft 5 which is axially and rotatably supported by the case frame 11. Although not shown, another worm having a screwing direction opposite to the screwing direction of the worm 12 is formed to be adjacent to the motor shaft 4. Driving force is transmitted to the second gear 15 by a deceleration member similar to the worm gear 13 and first gear 14.

The driving force of the motor 2 decelerated through the worm 12, worm gear 13, first gear 14, and second gear 15 is outputted to the output shaft 5. A crank arm (not shown) for a wiper is attached to the output shaft 5. As the motor 2 operates, the crank arm is driven through the output shaft 5. The wiper arm then operates via a link mechanism connected to the crank arm.

A relay plate may be attached to the output shaft 5, to perform detection of the position of the wiper arm. The relay plate rotates in synchronization with the output shaft 5. When the blade reaches upper and lower reversal positions, the polarity of a voltage applied to the motor 2 is switched. Thus, the motor 2 is rotated in normal and reverse directions, and the blade reciprocates between the upper and lower reversal positions.

A multi-polar magnetization magnet 16 (hereinafter abbreviated as a magnet 16) is attached to the motor shaft 4. Corresponding to this magnet, hall effect ICs 17 are provided in the case frame 11, facing the outer circumferential part of the magnet 16. FIG. 2 are explanatory views showing a relationship between the magnet 16 and the hall effect ICs 17, and output signals (motor pulse) from the hall effect ICs 17.

As shown in FIG. 2, two hall effect ICs 17 (17A, 17B) are provided at positions between which an angular difference of 90 degrees is maintained with respect to the center of the motor shaft 4. In the motor 2, the magnet 16 is magnetized to six poles. As the motor shaft 4 turns once, a pulse output equivalent to six cycles is outputted from each of the hall effect ICs 17. As shown in the right side in FIG. 2, pulse signals having phases which are shifted by a ¼ cycle from each other are outputted from the hall effect ICs 17A and 17B. Therefore, the rotation direction of the motor shaft 4 can be determined by detecting appearance timing of pulses from the hall effect ICs 17A and 17B. As a result of this, whether the wiper operation is on the forward process or backward process can be determined.

The rotation speed of the motor shaft 4 can be detected from the cycle of the pulse output from one of the hall effect ICs 17A and 17B. A correlation based on deceleration ratio and linkage ratio exists between the number of rotations of the motor shaft 4 and the speed of the blade. The speed of the blade can be calculated from the number of rotations of the motor shaft 4.

A magnet 18 for detecting the absolute position is mounted on the bottom of the second gear 15. A printed board 19 is mounted on the case frame 11, and a hall effect IC 20 is provided thereon, facing the magnet 18. One magnet 18 is provided on the bottom surface of the second gear 15, and faces the hall effect IC 20 when the blade comes to the lower reversal position. As described above, a crank arm is attached to the second gear 15, which rotates 180 degrees to reciprocate the blade. When the second gear 15 rotates to move the blade to the lower reversal position, the hall effect IC 20 and the magnet 18 face each other, so that a pulse signal is outputted. Incidentally, it is possible to obtain an absolute position signal with use of the relay plate described above.

Figure 3:
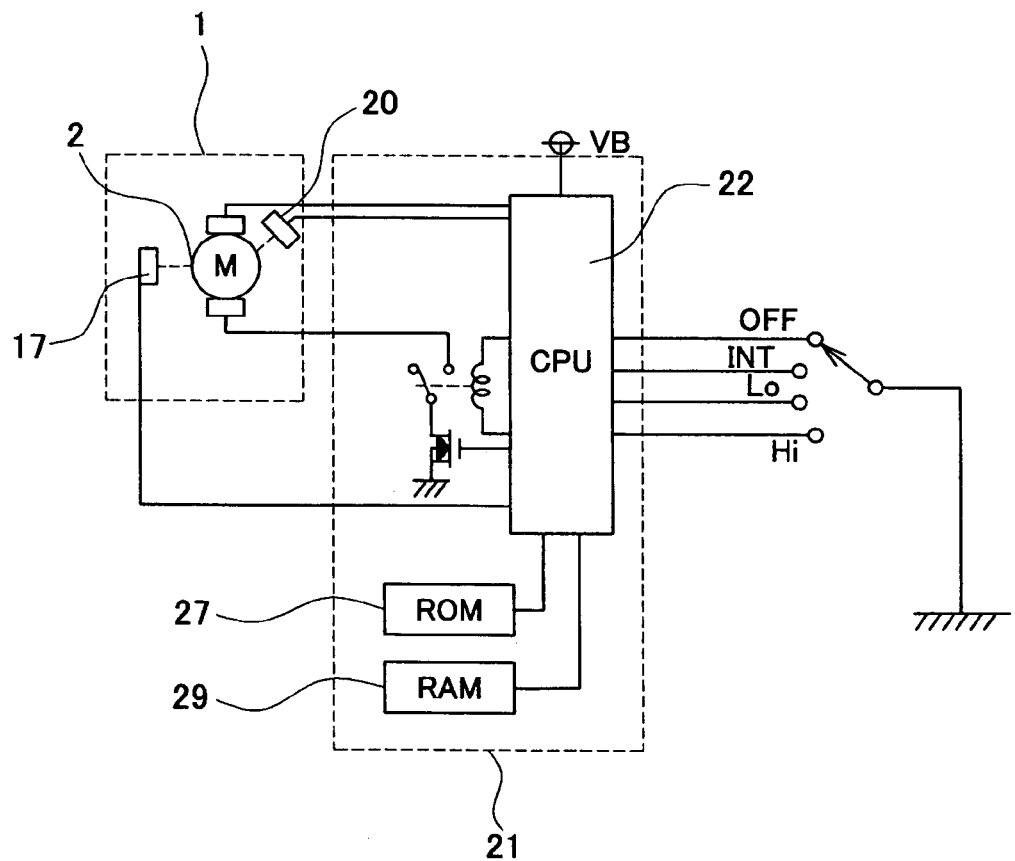
FIG. 3 is an explanatory diagram showing the structure of a control system of the motor.

Pulse outputs from the hall effect ICs 17 and 20 are fed to a wiper drive control device (motor control device) 21. FIG. 3 is an explanatory diagram showing the structure of the control system of the motor 2. A CPU 22 of the wiper drive control device 21 uses, as absolute position signals, the pulse outputs from the hall effect ICs 20, to recognize the position of the blade. Pulse signals from the hall effect ICs 17 are used as a relative position signal of the blade. By counting the number of pulses after obtaining the absolute position signals, the CPU 22 recognizes the current position of the blade. The current position of the blade is detected, depending on combinations of an absolute position signal indicative of the lower reversal position from the hall effect ICs 20, and the number of pulses from the hall effect ICs 17. The wiper drive control device 21 thus recognizes the current position and speed of the blade, and controls the motor 2 on the basis of the data.

The speed (the number of rotations) is detected based on the motor pulses from the hall effect ICs 17, and the motor 2 is subjected to feedback control. Also, PWM control is performed on the motor 2. The CPU 22 effectively changes the applied voltage, by turning ON/OFF the power source voltage, and changes the current amount of the brush 10, to control the speed of the motor 2. That is, the CPU 22 calculates the motor speed on the basis of the motor pulses from the hall effect ICs 17, and sets the time ratio (duty) of the ON period of the PWM control in accordance with the value of the motor speed. The CPU 22 processes the cycle (Hz) of the motor pulses, directly as the speed. Alternatively, control may be performed on the basis of the rotation speed (rpm) obtained from the pulse cycle.

On the other side, the CPU 22 performs an overload detection processing, based on the motor speed and duty calculated and set as described above. In this control processing, a load point value is calculated from the motor speed and duty, and is accumulated. When the accumulated point value exceeds a predetermined reference value, an overloaded state is determined, and a process of stopping the motor or the like is executed. This overload detection processing will now be described below.

Figure 4:
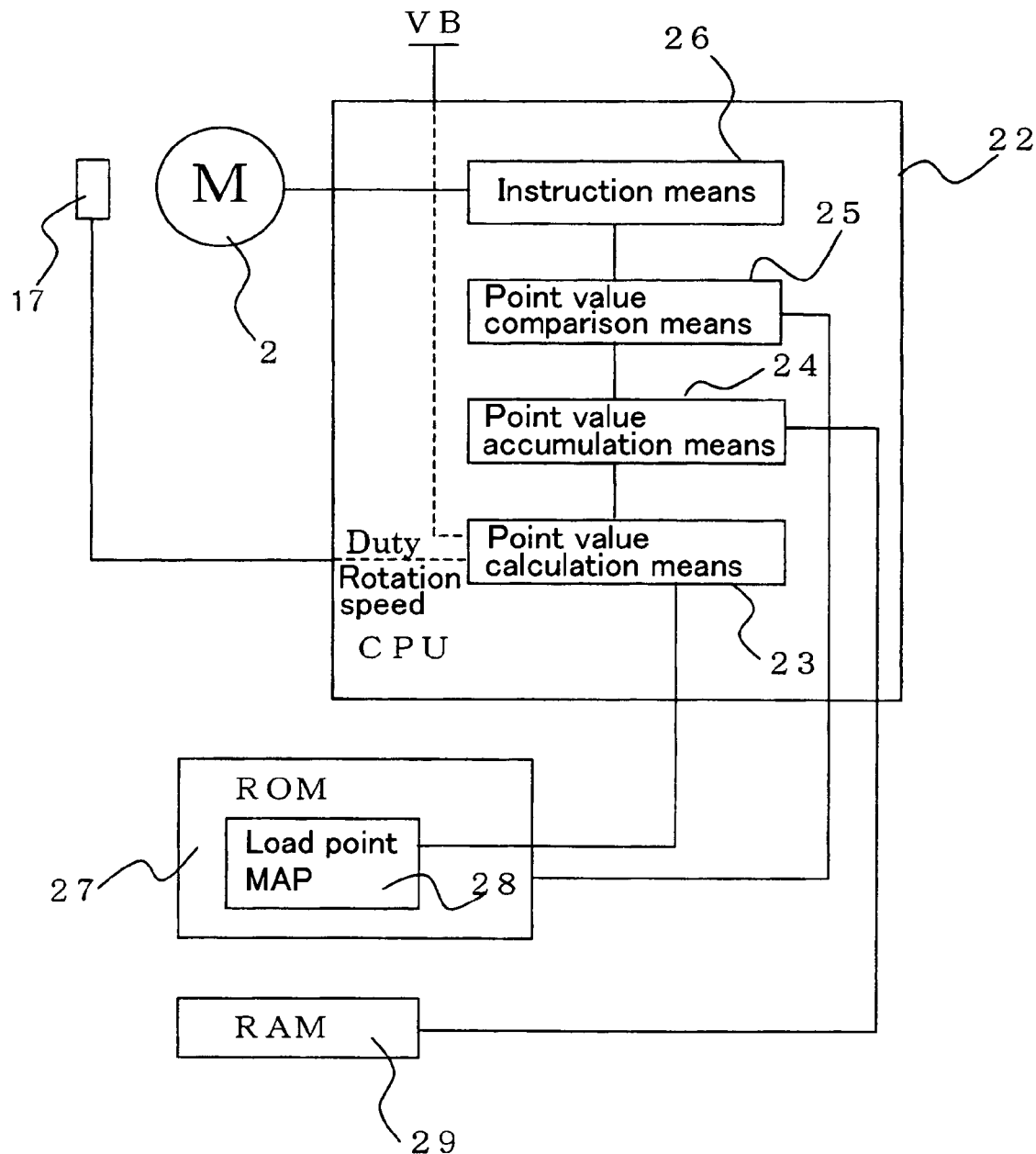
FIG. 4 is a block diagram showing the structure of an overload detection processing system in the motor control device according to the present invention.
Figure 5:
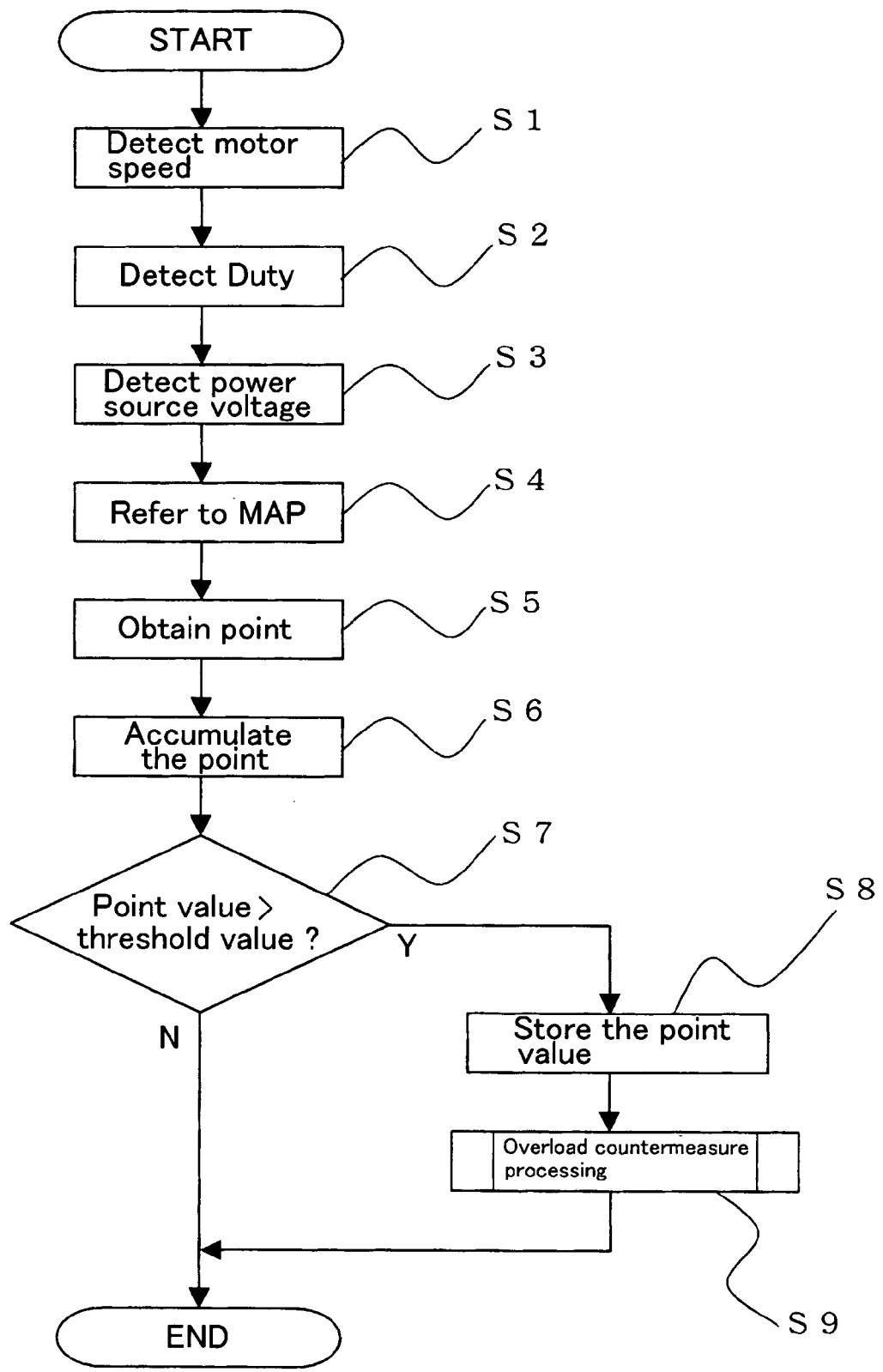
FIG. 5 is a flowchart showing a control procedure in an overload detection processing.

FIG. 4 is a block diagram showing the structure of an overload detection processing system in the CPU 22. FIG. 5 is a flowchart showing a control procedure in the overload detection processing. As shown in FIG. 4, the CPU 22 is provided with a point-value calculation means (point-value calculation unit) 23 which calculates a load point value from the motor speed and duty. The point-value calculation means 23 accesses a load point map 28 stored in advance in a ROM 27, and calculates a load point value.

In the rear stage of the point-value calculation means 23, there is provided a point-value accumulation means (point-value accumulation unit) 24 which accumulates the calculated load point value. The CPU 22 is provided with a point-value comparison means (point-value comparison unit) 25 which compares load point values accumulated by the point-value accumulation means 24 (e.g., an accumulated point value) with a reference value stored in the ROM 27. Further, in the rear stage of the point-value comparison means 25, there is provided an instruction means (instruction unit) 26 which instructs operation of the motor 2, based on a comparison result.

In the above CPU 22, an overload detection processing described below is performed, for example, at an interval of 10 ms. At first, in step S1, the motor speed is detected. This processing is carried out based on pulse signals from the hall effect ICs 17, and the cycle of the pulse signals is used directly as the motor speed. Next, in step S2, the duty is detected. The duty of the motor 2 is subjected to feedback control based on motor pulses, and the current motor duty (at present) is hereby detected. Further, in step S3, the battery (power source) voltage is detected.

Figure 6:
FIG. 6 is an explanatory table showing the structure of a load point map in the case where the power source voltage is 12 V.
Figure 7:
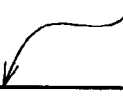
FIG. 7 is an explanatory table showing the structure of a load point map in case where the power source voltage is 15 V.

After the motor speed, duty, and power source voltage are obtained, the processing goes to step S4 where the load point map 28 is referred to. FIGS. 6 and 7 are explanatory tables showing the structure of the load point map 28. The load point map 28 is prepared, taking the motor speed (Hz) and duty (%) as parameters for every power source voltage. FIG. 6 shows a case where the power source voltage is 12 V (e.g., the load point map 28a). FIG. 7 shows another case where the power source voltage is 15 V (e.g., the load point map 28b). In the load point map 28, point values are set in accordance with the motor speed and duty. The point values are high under the circumstance that the duty is high or the rotation speed is low because of a heavy load.

For example, in the load point map 28a in FIG. 6, the load point value is "+10" when the duty is 80% and the motor speed (motor pulse) is 250 Hz. When the motor speed is as high as 500 Hz even with the same duty of 80%, the load is determined to be light, and the load point value is "0". However, in case of a motor speed of 200 Hz, the load is determined to be heavy, and the value is "+15". Otherwise, when the duty is 60% even with the same motor speed of 250 Hz, the load is determined to be a normal load, and the load point value is "0". However, if the duty is 100%, the load is determined to be heavy, and the load point value is "+15". In contrast, even if the duty is 80%, the load is determined to be light when the motor speed reaches 1000 Hz. The load point value is then "−5". While the motor is stopped, "−20" is set as a load point value.

Meanwhile, when the power source voltage is 15 V, the point distribution of the load point map 28 changes as shown in the load point map 28b. In this case, the current amount increases due to the increase in the power source voltage. Therefore, as shown in FIG. 7, the load point value is "+15" even under the same conditions (duty: 80%, Motor speed: 250 Hz) as described above. In contrast, the current amount decreases as the power source voltage decreases. Hence, in order to cope with a case in which the power source voltage is lower than 12 V, such a load point map 28 in which the load point values are set to be smaller even under the same conditions is used. Although any other load point map 28 particularly for the lower voltages is not shown in the figure, maps for 10 V and 11 V and the like are provided. Therefore, as is clear from the above explanation, the load point value is a comprehensive value representing a combination of the time ratio (duty), the motor speed, and the power source voltage.

Figure 8:
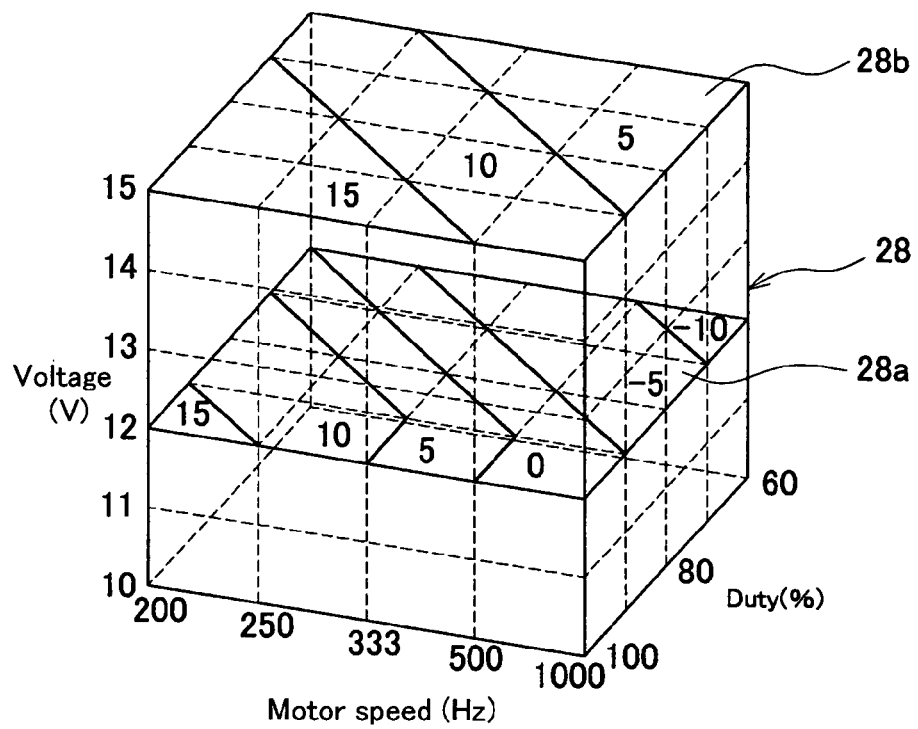
FIG. 8 is a model showing the whole structure of the load point map.
Figure 9:
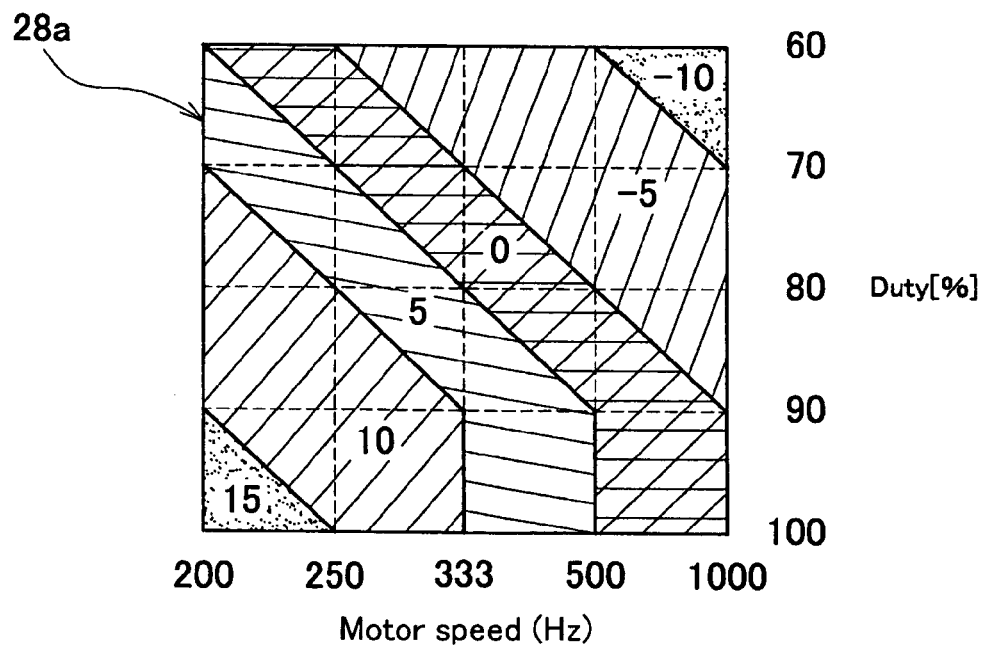
FIG. 9 is an exploded view of a load point map for 12 V.

Thus, the load point map 28 is set, including the power source voltages as parameters. The map can be summarized as a structure as shown in FIG. 8. FIG. 8 is a model showing the whole structure of the load point map 28. FIG. 9 is an exploded view of the load point map 28a for 12 V. As shown in FIG. 8, the load point map 28 forms a three-dimensional structure in which maps as shown in FIGS. 6 and 7 are stacked for power source voltages, respectively. For every voltage value, load point values are set in a load point map 28, as shown in FIG. 9. In other cases than the case of the values expressed along the vertical and horizontal axes as shown in FIG. 6, load point values are set. For example, in case of a motor speed of 750 Hz, the load point value is "−5" at the duty of 80% or "0" at 90%.

The load point map 28 is formed such that the point distribution gradually shifts as the power source voltage changes. In other words, load point values change continuously between voltages, in a manner described below. That is, as the voltage increases with respect to 12 V as a reference, the point distribution shifts to the positive (+) side. As the voltage decreases with respect to 12 V, the point distribution shifts to the negative (−) side. For example, if the power source voltage is 13.5 V, the load point value is set to "+15" when the duty is 100% and the motor speed is 333 Hz (while the load point value is "+10" under the same conditions if the voltage is 12 V or 13 V).

The point-value calculation means 23 accesses the load point map 28, and obtains a load point value corresponding to the present state of the motor, referring to the map (step S4) After obtaining the load point value, the processing goes to step S5, and adds this value to those load point values that have been obtained before by the point-value accumulation means 24. An accumulated point value thus added up is stored in the RAM 29, and is called out by the point-value accumulation means 24, in the next processing of step S5.

When a heavily loaded state continues, the accumulated point value becomes a positive great value because positive load point values appear continuously. Otherwise, when a normally loaded state or lightly loaded state continues, 0 and/or negative point values appear continuously, so that the accumulated point value becomes 0 or lower. When the accumulated point value takes 0 or a lower value, this accumulated point value is always set to 0. When the motor 2 operates normally, the accumulated point value indicates 0. If a heavily loaded state has once appeared and then the load is reduced to a controllable range, the accumulated load point is gradually reduced, and converges on 0 or a positive small value. Therefore, by seeing the accumulated point value, it is possible to know what state the motor 2 is in. If the value becomes a predetermined value or more, the state can be determined to be overloaded.

Hence, after an accumulated point value is obtained, the processing goes to step S7 in which the value is compared with a threshold value (reference value) to determine the loaded state. This threshold value is obtained by previously measuring such a point that causes overloading when the point becomes equal to or higher than a value, by means of experiments. This point is stored into the ROM 27. For example, if it can be said to be an overloaded state when the accumulated point value exceeds "100", "100" is set as a threshold value. If the accumulated point value does not exceed the threshold value, it is determined that an overloaded state has not yet come. The processing comes out of the routine. Otherwise, if the accumulated point value exceeds the threshold value, the processing goes to step S8 where the current accumulated point value is stored into the nonvolatile ROM 27 (storage means or storage unit). Thereafter, an overload-countermeasure processing is carried out in step S9.

The overload-countermeasure processing in step S9 is carried out by the instruction means 26. The motor 2 determined to be in an overloaded state is stopped immediately. At this time, an alarm lamp may be turned on or an alarm buzzer may be sounded. In this manner, the motor 2 avoids being operated long in an overloaded state and so can be prevented from being damaged in advance. In this case, positive (+) load points are accumulated continuously even if the motor 2 works at a low rotation-speed range immediately before being locked. The overloaded state can be found early. The overload-countermeasure processing may be to stop the motor 2 or to reduce the output of the motor 2 to maintain the least necessary functions.

On the other hand, if the motor is forcedly stopped in an overloaded state and is thereafter started again, the accumulated point value stored in the ROM 27 is used as an initial value. Likewise, if the motor in an overloaded state enters into a sleep mode or the power of the motor in an overloaded state is turned off, the value is used for restart. If the motor once comes into an overloaded state and is thereafter released from this state, the accumulated point value is reduced after restarting the motor and becomes 0 later. Otherwise, if the overloaded state is not yet eliminated even in the next operation, the processing immediately goes to step S9 and the motor 2 stops.

Storage of the accumulated point value into the ROM 27 need not be carried out only after the accumulated point value exceeds the threshold value and is determined to be an overloaded state. This storage can be carried out by setting an appropriate condition, e.g., when the accumulated point value reaches 75% of the threshold value or higher. Needless to say, the latest value may always be overwritten.

Thus, the motor 2 is capable of detecting an overloaded state and performing a countermeasure thereof, without using a circuit breaker or current sensor. Therefore, costs can be reduced. Since a space for mounting a circuit breaker or current sensor is not required, the whole unit can be downsized. Accordingly, space saving and improvement of layout can be achieved. In addition, it is possible to perform an overload detection processing even when no space is allowed to mount a breaker or the like.

Further, the circuit breaker cuts a current at trip timing according to heat generation characteristics of the breaker, and therefore, cut-off timing is fixed. According to the present method, however, the timing can be arbitrarily set depending on the setting of the threshold value. That is, the current cut-off timing can be set by software, and therefore, the degree of freedom in the control form is high. Accordingly, control setting can be matched with use environments of the motor and peripheral devices. Specifically, the weakest part in a system can be protected by setting load point values and a threshold value suitable for characteristics of components which easily generate heat or hardly radiate heat.

For example, if a FET or relay exists near the motor, the FET or the like is weaker against heat than the motor, in general cases. Hence, a relationship between heat generation from the motor and temperature characteristics of the FET or the like in the device is measured in advance. Setting can be arranged such that a threshold value is exceeded when the heat generation amount from the motor comes to affect the FET or the like. In this case, the output characteristics of the motor itself deteriorate as the atmospheric temperature increases. Specifically, the rotation speed does not increase although the output is raised. The motor speed decreases while the duty increases. Then, the load point value accordingly becomes great, and the accumulated point value increases. If load point values and a threshold value are set with greater importance given to influences on the FET or the like, the motor output can be reduced or stopped to protect the FET even when the motor itself is not overloaded. In this case, the motor itself functions like a temperature sensor. Setting of this kind is particularly effective when a sensor cannot be directly mounted on a FET or the like.

The present invention is not limited to the embodiment described above and, needless to say, can be variously modified without deviating from the scope of the subject matter of the invention.

For example, the load point map 28 described above is merely an example. Point values thereof and the relationship with parameter values can be changed appropriately. Also in the load point map 28, each load point value is determined by three parameters. However, each load point value may further be corrected in correspondence with the atmospheric temperature. For example, a thermistor or the like may be provided near the motor 2, and FIGS. 6 to 9 may be taken as reference values when the atmospheric temperature is 25° C. Point values may be increased or decreased by 5 points every time the temperature changes 10° C. Specifically, the load point map 28 may be used, with the point values corrected to be increased by +5 points when the temperature is 35° C. as well as −5 points when the temperature is 15° C. As a result of this, overload detection accuracy can be improved, and products have improved reliability.

Also the above embodiment has suggested a structure in which the current accumulated point value is stored into the ROM 27 when the accumulated point value exceeds a threshold value. However, the accumulated point value may be constantly overwritten with the latest value, which may be stored into the ROM 27. In this case, the accumulated point value can be used as an initial value not only in a case in which the motor in an overloaded state is forcedly stopped or a case in which the device in an overloaded state enters into a sleep mode, but also in a case in which the motor is restarted from a normally stopped state. Alternatively, it is possible to arrange the structure as follows. That is, the accumulated point value is stored into the ROM 27 only when the accumulated point value exceeds a threshold value. Only at the time of forced stop of the motor or sleep in an overloaded state, the stored value is set as an initial value.

The above embodiment has been described with reference to the case of a motor in which forward/backward inversion is achieved by two brushes. The present invention, however, is applicable to a type of motor which changes the motor rotation speed by use of three brushes (Common, Hi, Lo).

In addition, the above embodiment suggests an example in which the present invention is applied to control of a motor for a wiper. Application of the present invention is not limited to this, and can be applied to a motor for use in a tail gate, sliding door, powered window, sunroof, or the like of a car. In addition, the control method and device of the present invention are applicable not only to a motor for a car but also to a motor for various electric devices. The above embodiment has been described with reference to a motor unit having a gear box 3. The present invention, however, is applicable to a motor not having the gear box 3.

Thus, according to the motor control method and device of the present invention, load point values calculated on the basis of the time ratio of the ON period of the power source voltage applied to the motor and the speed of the motor are accumulated. When the accumulated point value exceeds a predetermined reference value, an overload control processing is performed on the motor. Therefore, an overloaded state can be detected and a countermeasure against the overloaded state can be taken, without using a circuit breaker or a current sensor. As a result, costs can be reduced. Further, since space is unnecessary for such a circuit breaker or current sensor, the whole unit can be downsized. Accordingly, space saving and improvement of layout can be achieved. In addition, it is possible to perform an overload detection processing even when there is no space to mount a breaker or the like. Further, reference values can be appropriately set by software. Therefore, the degree of freedom in the control form is so great that control setting can be matched with use environments of the motor and peripheral devices.

The invention claimed is:

1. A motor control device comprising:
    a point value calculation unit for calculating a load point value based on a time ratio of an ON period of a power source voltage applied to a motor, a speed of the motor, and a power source voltage value such that the load point value calculated by said point value calculation unit changes according to a load of the motor and such that the load point value is a comprehensive value representing a combination of the time ratio, the speed of the motor, and the power source voltage value, said point value calculation unit being operable to calculate the load point value by referring to a load map in which the load point value is identified by parameters including the time ratio, the speed of the motor, and the power source voltage value arranged in a three-dimensional structure;
    a point value accumulation unit for accumulating each load point value calculated by said point value calculation unit to obtain an accumulated point value;
    a point value comparison unit for comparing the accumulated point value with a predetermined reference point value; and
    an instruction unit for performing an overload control process on the motor if the accumulated point value exceeds the reference point value.

2. The motor control device according to claim 1, wherein the load map indicates the load point value according to an atmospheric temperature of the motor as a further parameter.

3. The motor control device according to claim 1, wherein said instruction unit is operable to perform the overload control stopping the motor.

4. The motor control device according to claim 1, wherein said instruction unit is operable to perform the overload control reducing an output of the motor.

5. The motor control device according to claim 1, further comprising a storage unit for storing the accumulated load point value before the motor stops.

6. The motor control device according to claim 5, wherein, if the motor is restarted after once having been stopped, said point value accumulation unit is operable to refer to the accumulated point value stored in said storage unit and to utilize the accumulated point value stored in said storage unit as an initial value of the accumulated point value.

7. The motor control device according to claim 1, wherein the load point value calculated by said point value calculation unit is a high value when the time ratio is high or when the speed of the motor is low due to a heavy load.

8. A vehicle wiper comprising:
    a wiper blade;
    a motor for moving said wiper blade; and
    a motor control device for controlling said motor, said motor control device including:
        a point value calculation unit for calculating a load point value based on a time ratio of an ON period of a power source voltage applied to a motor, a speed of the motor, and a power source voltage value such that the load point value calculated by said point value calculation unit changes according to a load of the motor and such that the load point value is a comprehensive value representing a combination of the time ratio, the speed of the motor, and the power source voltage value, said point value calculation unit being operable to calculate the load point value by referring to a load map in which the load point value is identified by parameters including the time ratio, the speed of the motor, and the power source voltage value arranged in a three-dimensional structure;

a point value accumulation unit for accumulating each load point value calculated by said point value calculation unit to obtain an accumulated point value;

a point value comparison unit for comparing the accumulated point value with a predetermined reference point value; and an instruction unit for performing an overload control process on said motor if the accumulated point value exceeds the reference point value.

9. The vehicle wiper according to claim 8, wherein the load map indicates the load point value according to an atmospheric temperature of the motor as a further parameter.

10. The vehicle wiper according to claim 8, wherein said instruction unit is operable to perform the overload control process by stopping said motor.

11. The vehicle wiper according to claim 8, wherein said instruction unit is operable to perform the overload control process by reducing an output of said motor.

12. The vehicle wiper according to claim 8, further comprising a storage unit for storing the accumulated load point value before said motor stops.

13. The vehicle wiper according to claim 12, wherein, if said motor is restarted after once having been stopped, said point value accumulation unit is operable to refer to the accumulated point value stored in said storage unit and to utilize the accumulated point value stored in said storage unit as an initial value of the accumulated point value.

14. The vehicle wiper according to claim 8, wherein the load point value calculated by said point value calculation unit is a high value when the time ratio is high or when the speed of said motor is low due to a heavy load.

* * * * *